J. A. McADOO.
Cotton Seed Planters.
No. 154,882. Patented Sept. 8, 1874.
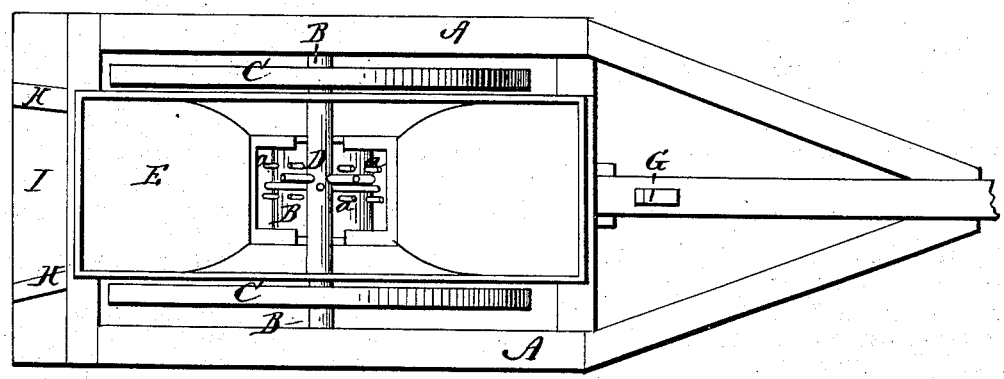
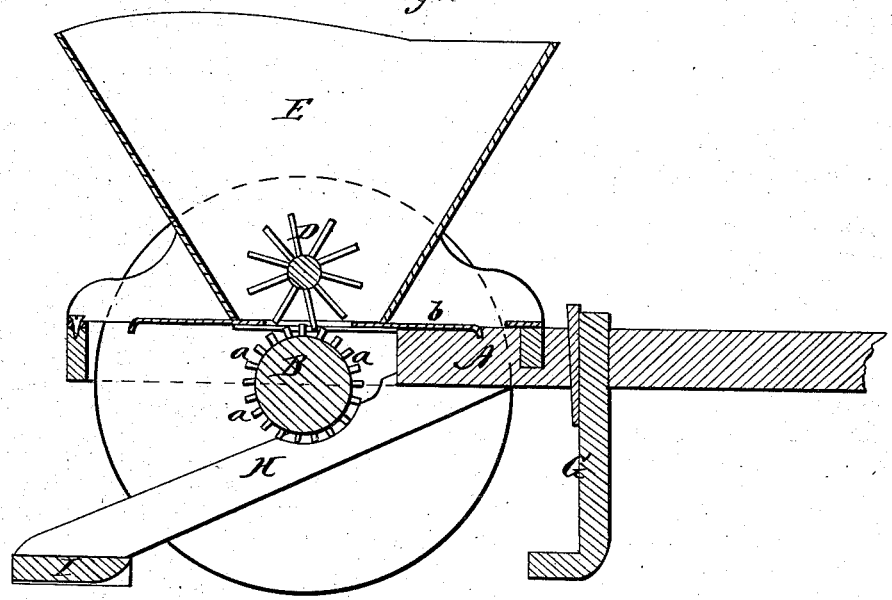
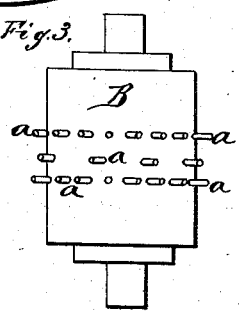

UNITED STATES PATENT OFFICE.

JOHN A. McADOO, OF JACKSON, TENNESSEE.

IMPROVEMENT IN COTTON-SEED PLANTERS.

Specification forming part of Letters Patent No. 154,882, dated September 8, 1874; application filed November 6, 1873.

*To all whom it may concern:*

Be it known that I, JOHN A. McADOO, of Jackson, in the county of Madison and in the State of Tennessee, have invented certain new and useful Improvements in Cotton - Seed Planters; and do hereby declare that the following is a full, clear, and exact description thereof, reference being had to the accompanying drawings, and to the letters of reference marked thereon, making a part of this specification.

The nature of my invention consists in the construction and arrangement of a cotton-planter, as will be hereinafter more fully set forth.

In order to enable others skilled in the art to which my invention appertains to make and use the same, I will now proceed to describe its construction and operation, referring to the annexed drawing, in which—

Figure 1 is a plan view, and Fig. 2 a longitudinal vertical section, of my cotton-planter. Fig. 3 is an enlarged view of the axle.

A represents the frame, in which is placed an axle, B, with a driving-wheel, C, near each end. The axle B is enlarged between the two driving-wheels, and midway upon the same are arranged a series of three or more rows of feed-teeth, $a$ $a$, inserted into the axle. Ordinarily I consider three rows to be sufficient. The teeth in the outer rows are laterally in line with, and just opposite to, each other. The middle row has only half the number of teeth contained in the outer row on either side thereof, and are placed equidistant. The teeth of the center row $a$ work into the teeth of, and propel, a wheel, D, in the hopper E, which wheel acts as a seed-stirrer.

The hopper may be made of wood or any other suitable material; and is supported upon the front and rear bars of the frame A, and provided with a movable plate or slide, $b$, situated conveniently therein, for the purpose of increasing or decreasing the discharge of seed.

G represents the opener, secured in a mortise in the beam just in advance of the front cross-bar of the frame, and may be raised and lowered at pleasure. This opener is made of iron, its lower end bent toward the rear, and opens the row evenly and uniformly as to depth.

H H represent two spring-arms secured to the center bar and rear end of the beam, and extending backward under the axle to a point a little behind the rear of the frame. At their rear ends these arms are provided with a drag-block, J, which is forced down by the action of the springs, so as to drag on the ground, and act as a coverer.

By the use of the teeth $a$ $a$ on the axle the seed is distributed, and the stirrer-wheel operated without the use of gearing or belting. And by the manner in which the teeth interlock to drop the seed, they are automatically cleaned, so that it is impossible for the feeding arrangement to become clogged, requiring no delay in order to clean them out.

Having thus fully described my invention, what I claim as new, and desire to secure by Letters Patent, is—

The combination of the driving-wheels C C and the enlarged driving-axle B, having circumferentially placed rows of teeth $a$ $a$ $a$, the center row of which contains one - half the number of teeth contained in the outer rows, with the stirrer-wheel D, hopper E, and slide $b$, all substantially as and for the purposes herein set forth.

In testimony that I claim the foregoing, I have hereunto set my hand this 9th day of August, 1873.

J. A. McADOO.

Witnesses:
L. T. LINDSEY,
JNO. T. STARK.